(12) United States Patent
Mortazavi et al.

(10) Patent No.: US 7,997,594 B1
(45) Date of Patent: Aug. 16, 2011

(54) SPORTS EQUIPMENT CADDY

(76) Inventors: Davood Mortazavi, Sapulpa, OK (US);
James Schroeder, Broken Arrow, OK (US)

( * ) Notice: Subject to any disclaimer, the term of this patent is extended or adjusted under 35 U.S.C. 154(b) by 459 days.

(21) Appl. No.: 12/315,151

(22) Filed: Nov. 29, 2008

(51) Int. Cl.
*B62B 1/00* (2006.01)
*B62D 61/12* (2006.01)
*B65D 85/00* (2006.01)

(52) U.S. Cl. .............. 280/47.26; 280/79.2; 280/47.19; 280/43.24; 280/646; 280/652; 206/315.9; 312/49

(58) Field of Classification Search .............. 280/35, 280/37, 38, 39, 40, 641, 645, 646, 42, 651, 280/652, 43.1, 43.24, 47.131, 47.17, 47.19, 280/47.24, 47.26, 47.33, 47.34, 47.35, 47.41, 280/63, 79.2; 206/315.9, 315.91; 312/49; 224/919, 274; 221/306; 473/517
See application file for complete search history.

(56) References Cited

U.S. PATENT DOCUMENTS

| | | | |
|---|---|---|---|
| 1,140,220 A * | 5/1915 | Wein et al. ............... | 221/267 |
| 2,780,508 A * | 2/1957 | Bonderer ............... | 312/49 |
| 2,868,559 A * | 1/1959 | Vincelette ............ | 280/47.33 |
| 3,010,775 A | 11/1961 | Giovannelli | |
| 4,082,209 A * | 4/1978 | Sanders ............... | 224/274 |
| 4,869,365 A * | 9/1989 | Perdue et al. ............ | 206/315.5 |
| 5,203,815 A * | 4/1993 | Miller ..................... | 43/21.2 |
| 5,458,350 A * | 10/1995 | Johnson et al. ........... | 280/47.26 |
| 5,797,612 A | 8/1998 | Buccioni | |
| 5,975,293 A | 11/1999 | Fowler | |
| 5,988,433 A * | 11/1999 | Crum ..................... | 221/309 |
| 6,481,595 B1 | 11/2002 | Chilton | |
| 6,663,119 B2 | 12/2003 | White | |
| 6,719,306 B2 | 4/2004 | White | |
| 6,817,469 B2 * | 11/2004 | Chang .................. | 206/315.7 |
| 7,229,085 B2 | 6/2007 | Pederson | |
| 7,360,784 B2 * | 4/2008 | Stewart et al. ........... | 280/656 |
| 7,398,888 B1 | 7/2008 | Nowak | |
| 7,479,076 B2 * | 1/2009 | Verga .................. | 473/517 |
| 2002/0113386 A1 * | 8/2002 | Be ....................... | 280/47.19 |
| 2006/0027999 A1 * | 2/2006 | Hardin et al. ........... | 280/646 |
| 2007/0163903 A1 * | 7/2007 | Howard ................ | 206/315.9 |

* cited by examiner

*Primary Examiner* — John R Olszewski
(74) *Attorney, Agent, or Firm* — Randal D. Homburg

(57) ABSTRACT

A transportable caddy for sports equipment provides multiple storage containers and structures for storing sports equipment in a secured frame, providing a ball rack with a release means allowing for the balls to be intentionally released into the playing arena, storage containers for clean and dirty sports gear, sports markers and hardware, refreshment containers, and other items associated with a particular sport, primarily soccer, basketball, baseball or other sport which requires the transport of bulk equipment to and from the practice or playing venues.

4 Claims, 5 Drawing Sheets

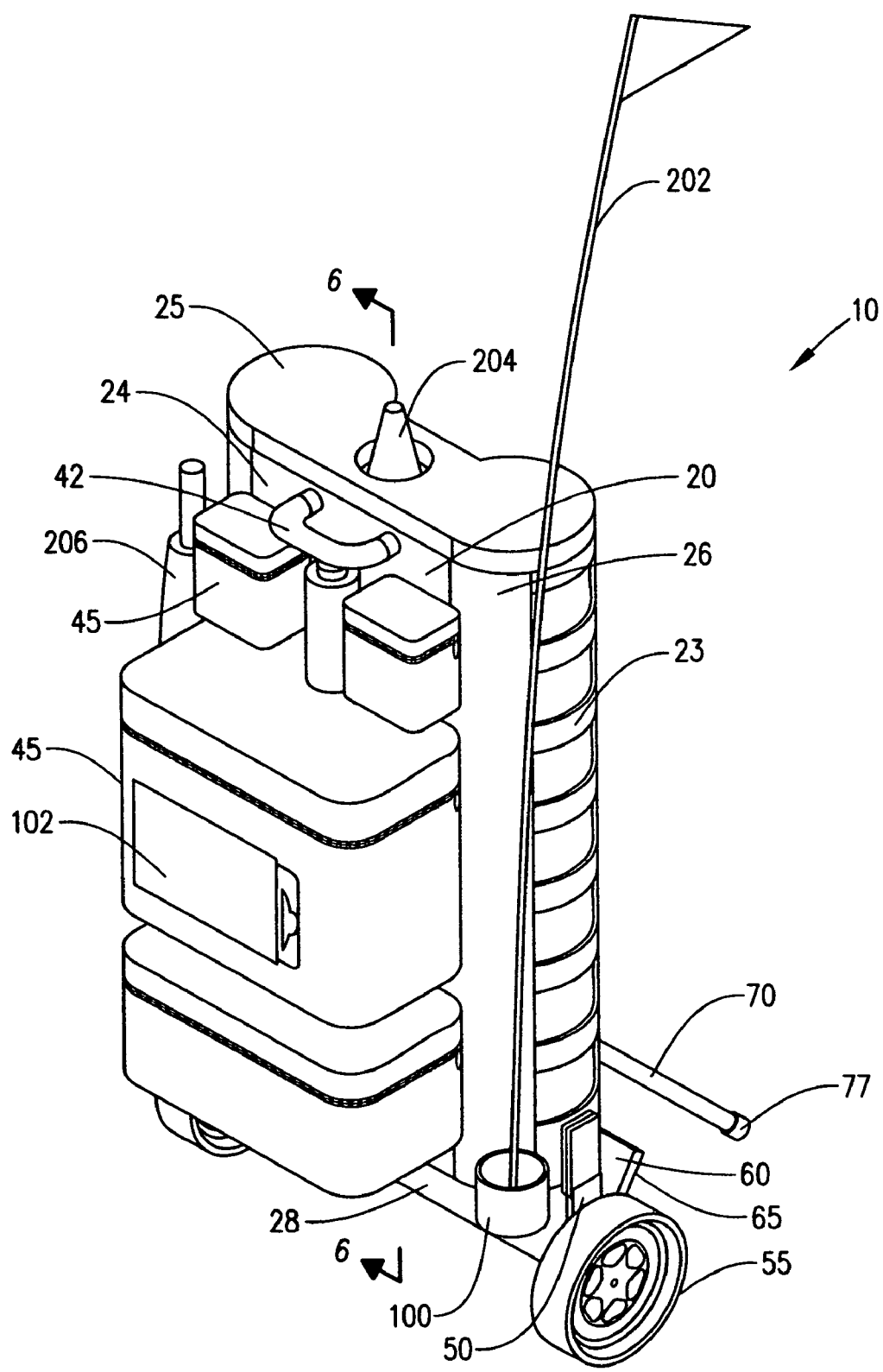
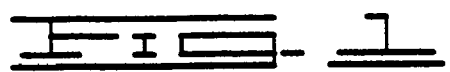

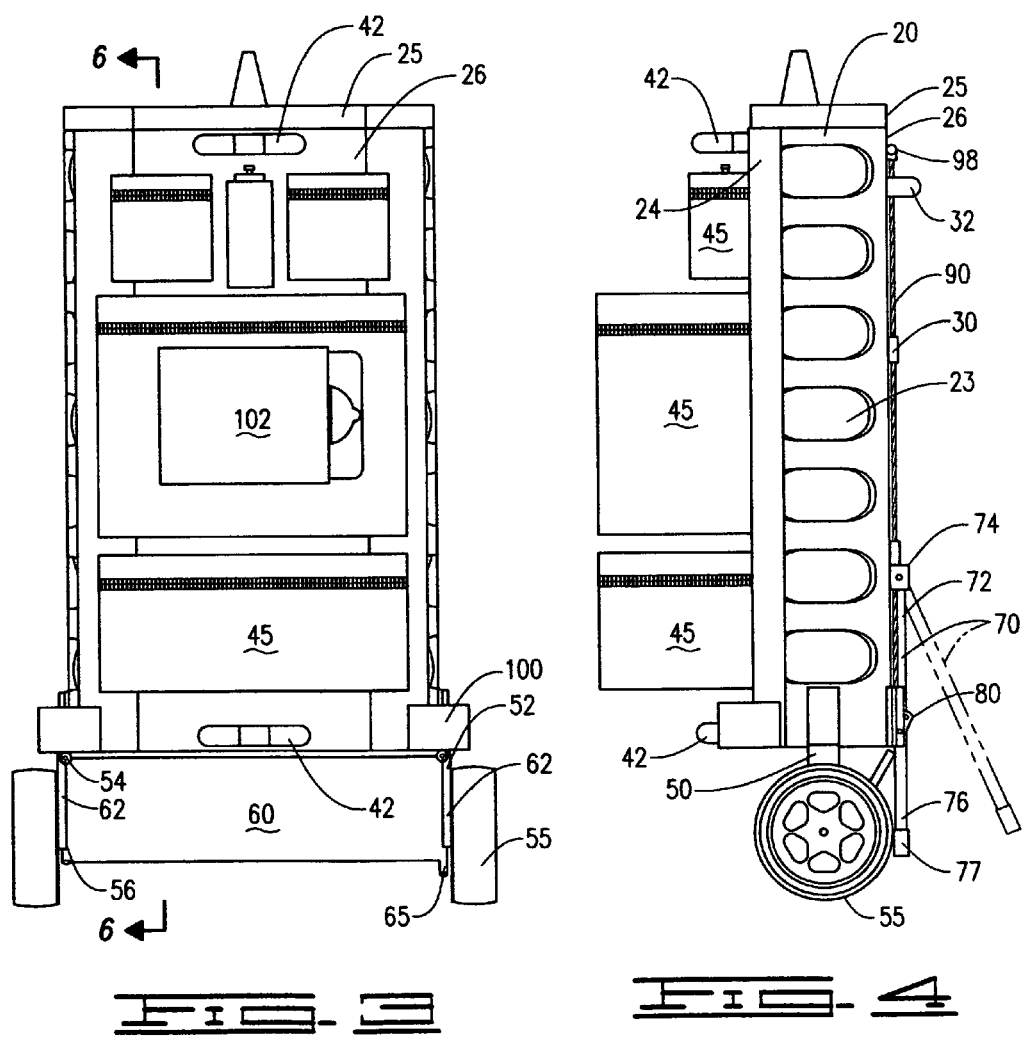

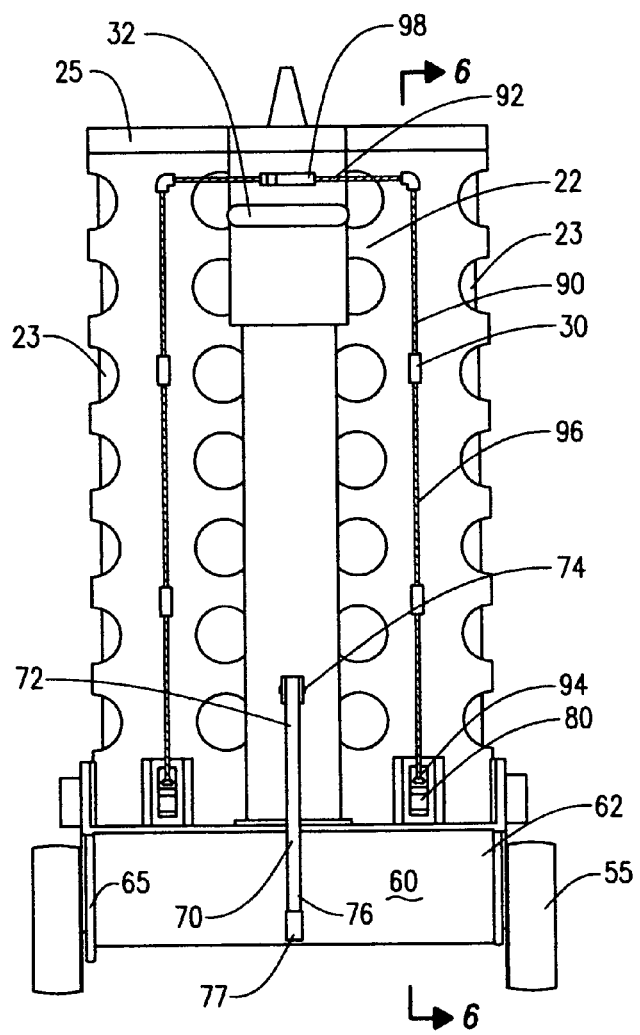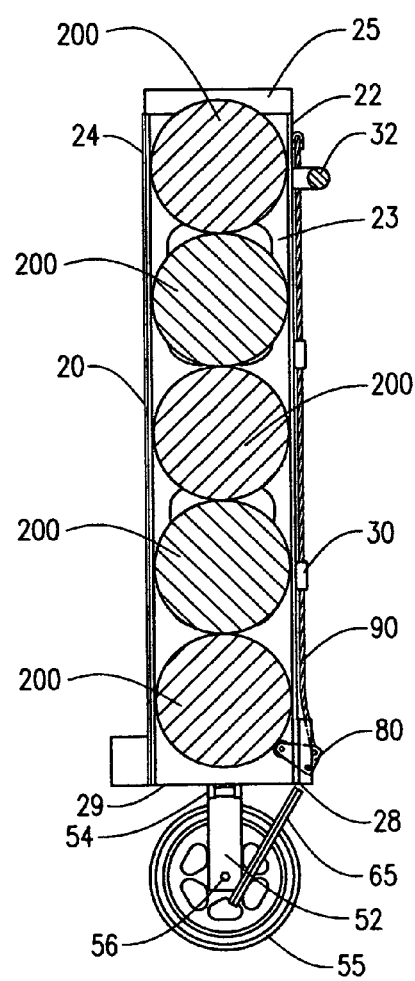

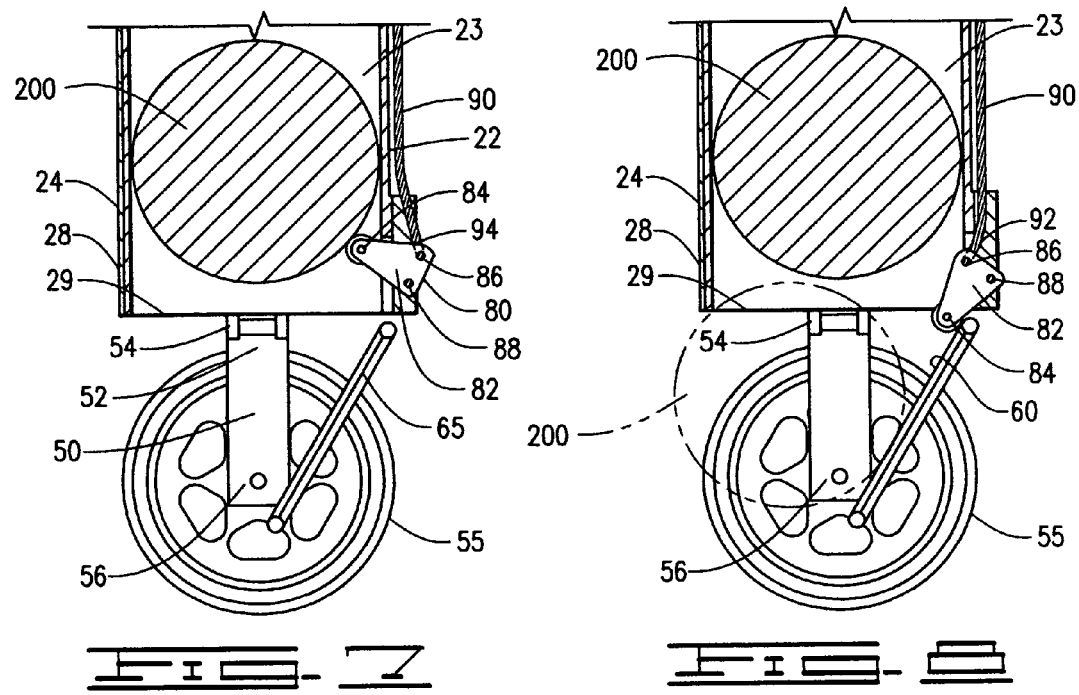
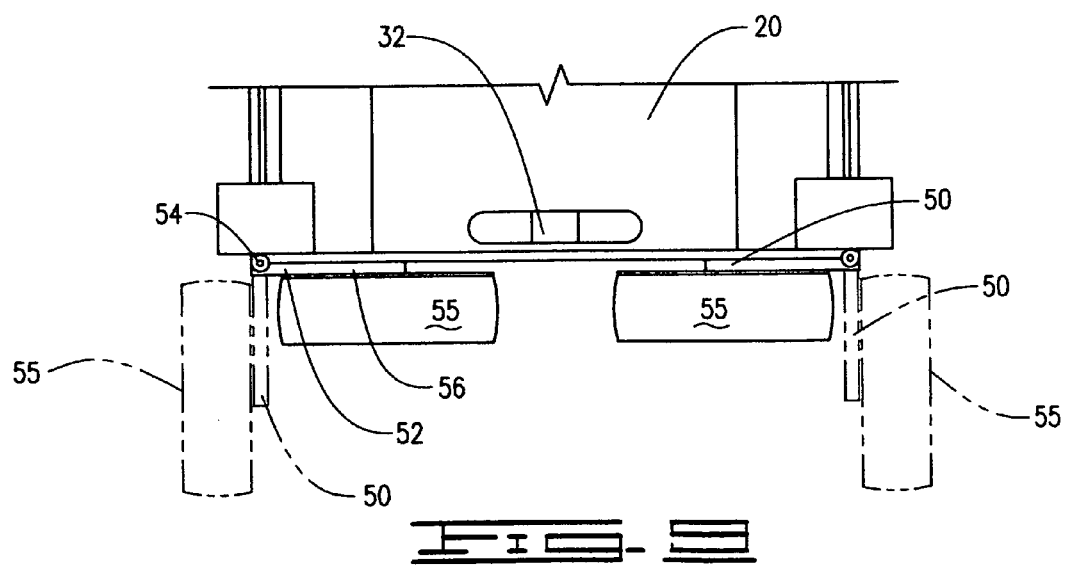

SPORTS EQUIPMENT CADDY

CROSS REFERENCE TO RELATED APPLICATIONS

NONE

I. BACKGROUND OF THE INVENTION

1. Field of Invention

A transportable caddy for sports equipment provides multiple storage containers and structures for storing sports equipment in a secured frame, providing a ball rack with a release means allowing for the balls to be intentionally released into the playing arena, storage containers for clean and dirty sports gear, sports markers and hardware, refreshment containers, and other items associated with a particular sport, primarily soccer, basketball, baseball or other sport which requires the transport of bulk equipment to and from the practice or playing venues.

2. Description of Prior Art

The following United States patents were discovered and are disclosed within this application for utility patent. All relate to storage and transport devices for sports equipment.

A sports equipment cart is disclosed in U.S. Pat. Nos. 6,719,306 and 6,663,119 to White. In White '119, The sports bag defines a primary tube, preferably made from PVC tubing. The tube has an upper ball receiving opening and a lower saddle shaped ball dispensing aperture from which balls stored in the tube may be manually withdrawn. Two wheels are mounted on an axle at the lower aperture, allowing the "cart" to be pulled by a handle near the upper opening. An outer surface of the tube provides paired spaced holes for pegs to be placed, as well as other smaller ball containing secondary tubes. The drawings also indicate means for attaching a baseball bat the outer surface of the primary tube. Large balls are stored in the primary tube and smaller balls are stored in the secondary tubes. White '306 is virtually the same patent except that it provides two tandem primary tubes and covers for the wheels, not disclosed in White '119, and also indicates a couple of different extruded handles as opposed to the cutout handle of White '119. The later patent also shows a variety of different wheels on the lower end of the device.

Of similar design, disclosed elements and function is U.S. Pat. No. 7,398,888 to Nowak, which is a ball carrying caddy made from metal wire defining a cylindrical cage and wire hooks, which rolls across a surface providing a vertical stack of balls loaded from an upper aperture and removed from a lower aperture by manually withdrawing the lowest ball in a stack. U.S. Pat. No. 6,481,595 to Chilton shows a cylindrical ball dispenser mounted to a surface holding a stack of balls to be withdrawn from a lower aperture and loaded at an upper opening.

In U.S. Pat. No. 5,988,433 to Crum, yet another cylindrical ball holding device is shown holding a stack of balls dispensed manually at a lower end by pulling down on the sides of the ball to rotate and remove it from side stoppers which hold the lower most ball within the cylinder. There is also some type of spring, arm and hinge described in the specification of this patent referred to, but not shown in any drawings that can release the ball. It is highly unlikely this patent would have issued had it been filed under the recent heightened scrutiny of the patent office, but some type of unknown means does exist for releasing the ball in the stack in the verbiage of this patent. Additional objects are located on the outer surface of the tube, including hook-like objects, air pumps, air vent holes serving no apparent purpose, and a dispenser rod with a flag connected to a cross hair, setting on top of the uppermost ball to indicate how many balls are in the tube if a use is unable to see the balls through a vertical slot in the side of the cylinder.

A sports equipment container having wheels and a handle and sports equipment stored inside its several compartments and storage containers is disclosed in U.S. Pat. No. 5,797,612 to Buccioni. The device indicates a first storage container attached to the wheels and handle, and a second detachable frame with doors mounted to the container. The doors provide access to the internal compartment of the container and also provide a mounting surface for baskets and racks. Several baskets and racks are also suspended within the inside of the primary compartment which may hold nearly anything. The doors to the container are hingably engaged and also provide a means of securing and locking the equipment inside. In other words, it appears to be a piece of rolling luggage with an intended use for carrying sports equipment, including a hockey stick attached by some clips on the outside of the container, which demonstrates the hockey sticks serving as the handles used to tilt and roll the device during transport. Similar storage devices are also shown in U.S. Pat. No. 5,975,293 to Fowler, 7,229,085 to Pederson, and 3,010,775 to Giovannelli.

II. SUMMARY OF THE INVENTION

Youth sports activities have been increasingly popular among families with small children and teenagers. Until a child is old enough from school sponsored sports, community organizations, after school entities and associations provide young children with a venue, leagues, teammates, coaches and sponsors to expose them to sports activities until they are advanced enough for school sponsored competitive athletic programs or simple school recess. Locations for these activities are generally shared, with no team having a true "home field, and practice locations are wherever an empty lot can be found. Volunteer coaches, primarily parents of child participants, are responsible for the transportation and provision of the team equipment at practices and competition, including uniforms, beverages, balls, markers, teaching material, charts, rosters and record documents. For those responsible for the equipment, a caddy having adaptive features to carry and secure all the equipment required for a team sport which is transportable and able to be loaded and unleaded from a vehicle would be a convenient item to those teams on the go.

The primary objective of the invention is to provide a sports caddy for youth or adult sports which provides features to secure most items required of that sport within a singular transportable device. A secondary objective would be to provide the device with not only storage features, but also with a ball securing and selective dispensing means, removable and configuring storage containers for accessory items, wheels for transport, and multiple handles for moving the device in and out of a vehicle and across a field or court. Yet another objective is to provide the device for use during an event to keep and maintain the equipment not being used, to hold documents and charts and to provide standby support for objects used, consumed or in need of replacement during the sporting event.

III. DESCRIPTION OF THE DRAWINGS

The following drawings are submitted with this utility patent application.

FIG. 1 is a front perspective view of a sports equipment caddy.

FIG. 3 is a front view of the sports equipment caddy.

FIG. 4 is a side view of the sports equipment caddy.

FIG. 5 is a rear view of the sports equipment caddy.

FIG. 6 is a side sectional view of the sports equipment caddy along reference lines 6/6 of FIGS. 1, 3 and 5 of the drawings.

FIG. 7 is an expanded lower sectional view of FIG. 6 with the ball release means in a closed retained position.

FIG. 8 is an expanded lower sectional view of FIG. 6 with the ball release means in an open released position.

FIG. 9 is an expanded lower sectional view of FIG. 3 with the wheels in a retracted position, with phantom lines indicating the wheels in the deployed position of FIG. 3 without the fabric angular deflector assembly.

IV. DESCRIPTION OF THE PREFERRED EMBODIMENT

Figure 2:
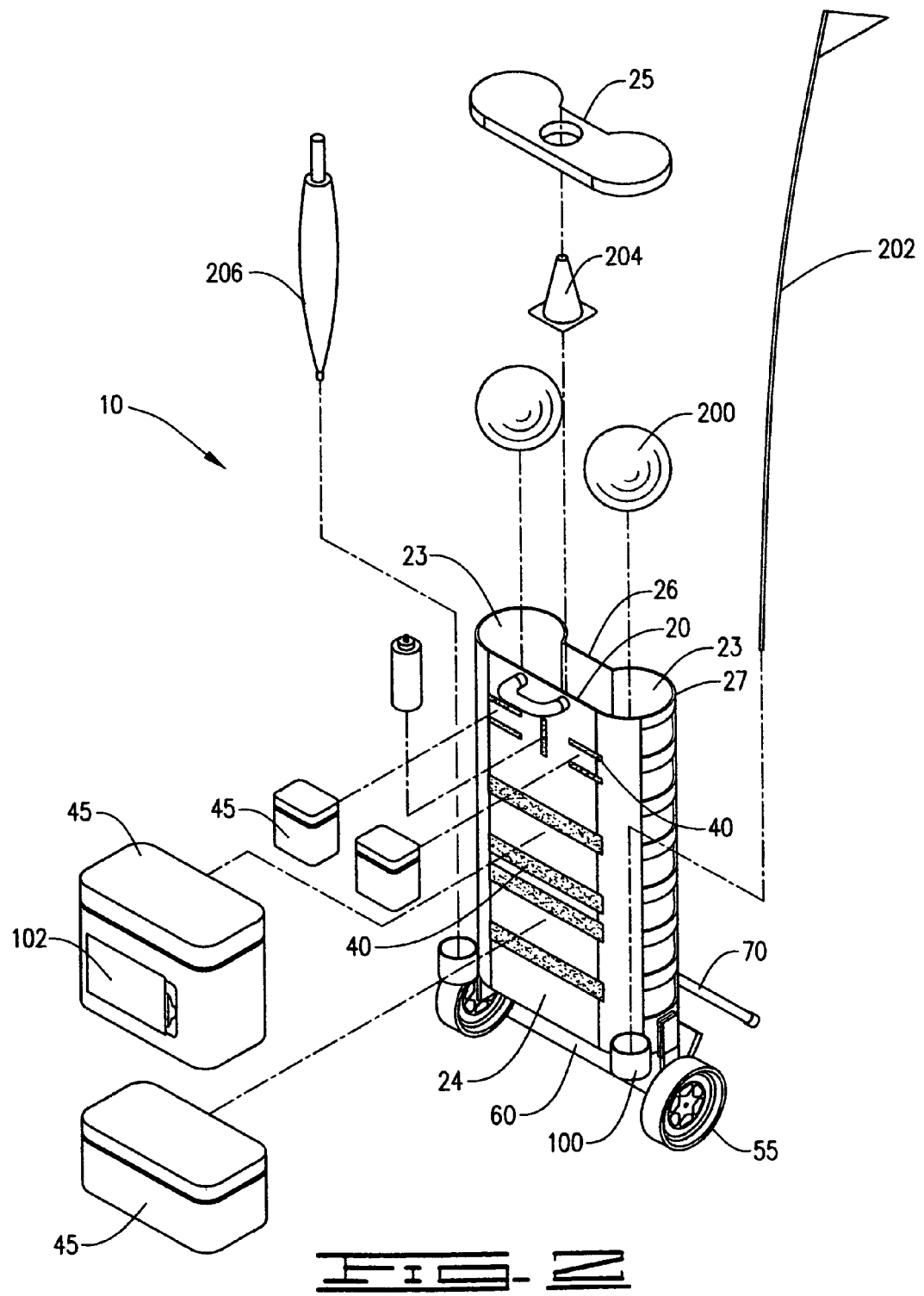
FIG. 2 is an exploded view of the component parts of the sports equipment caddy.

A sports equipment caddy 10 for the transport and storage of sports equipment, balls and other related accessories and supplies, indicated in FIGS. 1-9 of the drawings, is provided in an embodiment comprising a primary frame unit 20 including a rear surface 22, a front surface 24, an upper end 26 defining at least two separate parallel cylindrical chambers 23, each chamber 23 having an upper opening 27 and a lower opening 29 within which is located a ball releasing means 80 which retains a ball 200 placed and retained in each chamber 23, and a lower end 28 defining two lower extending retractable wheel supports 50 pivoting from the lower end 28 from a deployed position to a retracted position, each wheel support 50 attaching a respective wheel 55, the front surface 24 having a plurality of detachable connecting means 40 to which are applied a plurality of storage containers 45 of varying sizes and at least one pull handle 42 near the upper end 26, the rear surface 22 having a retracting kickstand support 70 allowing the caddy 10 to remain in an upright position, at least one pull handle 42, at least two independent cables 90 having a lower end 94 attached to each ball releasing means 80 and an upper end 92 attached to a ball release switch 98 which applies a tension to each cable 90, independently causing the selected ball releasing means 80 to be retracted by force from each respective lower opening 29 of each chamber 23, allowing the ball 200 within the chamber 23 to pass through the lower opening 29, a removable lid 25 attaching to the upper end 26 of the frame unit 20, closing off the upper opening 27 of the cylindrical chambers 23, and a flexible lower deflector plate 60 attached between two deflector supports 65, each deflector support attached to the respective wheel support 50, providing the deflector plate 60, when the wheels 55 are in the deployed position, in an angular alignment with the cylindrical chambers 23, shown in FIGS. 5 and 6, causing the ball 200 released from the lower opening 29 of the cylindrical chambers 23 to be directed from the front surface 24 of the caddy 10.

It is contemplated within the scope of this caddy that the primary frame unit 20 may also include other accessory devices, demonstrated in FIGS. 1 and 2, including but not limited to lower cup-shaped members 100 to hold flags 202, markers, chairs or umbrellas 206, bottle holders, clipboard pockets 102, cone shaped markers 204, which may also be located in the upper opening 27 as shown in FIGS. 1-5, especially where the caddy 10 is used for soccer or other field events.

The storage containers 45 may be provided with an insulated lining to keep stored beverages cold, may be provided with ventilation for storing clean or soiled uniforms or towels, or provided with locking means to secure cell phones, watches, jewelry, or medical supplies. The detachable connecting means 40 securing each storage container may be provided as hooks, straps, clips or as hook and loop fastening devices, indicated in FIG. 2, or a combination of several different means. Each storage container 45 may be rigid or collapsible or a combination of both. Each container may be open or provided with a closure, demonstrated in FIGS. 1-4 as zippers, or any other closure means, or a combination thereof. Since it is contemplated that the caddy may be used either indoors or outdoors, the storage containers may also be provided to resist water intrusion.

The primary frame unit 20 and the cylindrical chambers 23 may be embodied as a unitized component, or may be provided as the primary frame unit attached to cylindrical chambers, and the cylindrical chambers may be independent from one another. Depending on manufacturing or production cost factors, the unitized embodiment could be a single plastic or aluminum cast primary frame inclusive of the cylindrical chambers, or the primary frame unit could be made with each cylindrical chamber attached to the primary frame unit after being formed to the proper dimensions for the intended sports use, i.e. basketball, soccer, volleyball, playground balls, dodge balls, etc. This would allow for the construction of a single size primary frame unit and the ability to custom create the sports caddy for a particular sport or multiple sports as might be suitable for physical education classes or school recess.

The ball releasing means 80, shown in closer detail in FIGS. 5-8, may be provided as an arm member 82 having a front roller bearing end 84 and a rear cable connecting end 86 with a spring activated central mounting portion 88 pivotally mounted through the rear surface 22 at the lower opening 29, extending within each cylindrical chamber 23 restricting the lower opening 29 to retain the ball 200 placed within the cylindrical chamber. The arm member 82 would be intentionally pivoted from a tensioned closed position, shown in FIG. 7, to a forced open position, FIG. 8, by the movement of a ball release switch 98 attached to a cable 90 connected to the arm member 82 at the rear cable connecting end 86, lowering the roller bearing end 84, retracting the roller bearing end 84 from the lower opening 29 of the cylindrical chamber 23 enough to allow the ball 200 within the cylindrical chamber 23 to be released. The ball release switch 98, in the embodiment shown in the drawings where the caddy has two parallel cylindrical chambers, would best be provided with the ball release switch 98 being moved to the right to release a ball from the left cylindrical chamber and to the left to release a ball from the right cylindrical chamber. Each cable 90 in this embodiment would be similar to a throttle cable with an exterior 96 of the cable mounted to the rear surface 22 of the frame unit 20 by multiple cleats 30 with the lower end 94 of each cable 90 attached to each respective rear cable connecting end 86 of each arm member 82 and the upper end 26 of each respective cable 90 attached to the ball release switch 98, or to an independent ball release switch provided for each cable, not shown. The ball release switch 98 is preferably mounted to the rear surface 22 near a pull handle 32, shown in FIG. 5, or may be included as part of the pull handle.

The retractable wheel supports 50 are further disclosed, each having an upper portion 52 defining a hinge 54, with each hinge 54 attaching to the lower end 28 of the frame unit 20, and a lower portion 56 to which each wheel 55 in attached. Each wheel support 50 further attach the deflector support 65 upon which each end 62 of the deflector plate 60 is attached, which are drawn inward when the wheels 55 are placed in the retracted position, causing the deflector plate 60 to collapse into a folded position. This reason is why the deflector plate 60 is best presented as a flexible component.

The retracting kickstand support 70 is further disclosed as being a rigid rod having an upper end 72 attached to the rear surface 22 of the frame unit 20 by a restricted pivotal hinge 74 connected at any location not interfering with the ball release means 80, and a lower end 76 defining a stand tip 77. It is intended that the kickstand support 70 be engaged into an open position, shown in FIG. 4, most conveniently by the foot of the user when desired to be paced in an unattended upright position, and then pushed back into a stored position when the caddy 10 is in motion. In addition the apparent single rigid rod embodied in the drawings, the kickstand support could be provided as a retractable multiple piece rod, although not shown in the drawings as such.

The overall purpose of providing the caddy with the retracting kickstand, the retractable wheel supports, the storage containers with the detachable connecting means and the pull handles on both the front surface and the rear surface for multiple grasping locations to move the caddy during transportation and storage, and to make the caddy where it may be hauled in a vehicle to the various sports venues, maintaining nearly every associated item in a particular sport in one caddy. The retractable wheel supports allow the wheels to be folded beneath the caddy during transport in a vehicle to keep the wheels from being in contact with the vehicle interior, since it is likely outdoor use will leave the wheels dirty. The storage containers are detachable, because they may be washed when dirty or soiled, they may be loaded independently, they may be kept segregated from each other and taken separate places within the venue, and they may be removed as needed to lighten the weight of the caddy when placing the caddy in and out of the vehicle.

While the caddy 10 has been particularly shown and described with reference to a preferred embodiment thereof, it will be understood by those skilled in the art that changes in form and detail may be made therein without departing from the spirit and scope of the invention.

What is claimed is:

1. A sports equipment caddy for transporting and storing sports equipment, balls and other related accessories and supplies comprising:
    a primary frame unit including a rear surface, a front surface, an upper end and a lower end;
    at least two separate parallel cylindrical chambers located between said upper and lower ends, each cylindrical chamber defining an upper opening and a lower opening within which is located a ball releasing means retaining at least one ball placed within said cylindrical chamber;
    retractable wheel supports extending from said lower end pivotally movable between a deployed position during use and a retracted position during storage and transport, each wheel support attaching a respective wheel;
    a plurality of detachable connecting means attached to said front surface to which are applied a plurality of storage containers of varying sizes and at least one pull handle near said upper end;
    a retracting kickstand support attached by a hinge to said rear surface allowing said caddy to remain in an upright position, said rear surface further providing at least one pull handle;
    at least two independent cables attached to said rear surface by a plurality of cleats, each said cable having a lower end attached to each said ball releasing means and an upper end attached to a ball release switch which applies a tension to each cable, independently causing said selected ball releasing means to be retracted by force from each respective lower opening of each chamber, allowing said at least one ball within said cylindrical chamber to pass through said lower opening;
    a removable lid attaching to said upper end of said frame unit, closing off said upper opening of said at least two cylindrical chambers; and
    a flexible lower deflector plate attached between two deflector supports, each deflector support attached to said respective wheel support, providing said deflector plate, as said wheels are in the deployed position, in an angular alignment with said cylindrical chambers, causing said at least one ball released from said lower opening of said cylindrical chambers to be directed away from said front surface of said caddy.

2. The sports equipment caddy, as disclosed in claim 1, said ball releasing means further comprising:
    an arm member defining a front roller bearing end, a rear cable connecting end and a spring activated central mounting portion pivotally mounted through said rear surface at said lower opening, said roller bearing end extending within each said at least two cylindrical chambers restricting said lower opening to retain said at least one ball placed within each said at least two cylindrical chambers, said cable connecting end extending from said rear surface, said arm member pivoting from a tensioned closed position to a forced open position, and said lower end of said cable attaching to said cable connecting end, said ball release switch connected to said upper end of said cable, wherein said ball release switch is activated, tension is applied to said cable forcibly lowering said roller bearing end from said lower opening of said at least two cylindrical chamber allowing said at least one ball within said respective cylindrical chamber to be released from said caddy.

3. The sports equipment caddy, as disclosed in claim 1, each said retractable wheel support further comprising:
    an upper portion defining a hinge attaching to said lower end of said frame unit;
    a lower portion to which each wheel is attached; and
    said deflector support attached to said lower portion upon which ends of said flexible deflector plate are attached, said deflector supports drawn inward when said wheels are placed in said retracted position, said deflector plate collapsing into a folded position.

4. The sports equipment caddy, as disclosed in claim 1, said kickstand support further comprising: an upper end attached to said rear surface of said frame unit by a restricted pivotal hinge connected at any location on said lower end of said rear surface of said frame unit not interfering with said ball release means, and a lower end defining a stand tip, said kickstand support being engaged into an open position when said frame unit is to be placed in an unattended upright position, said kickstand support pushed back into a stored position when said caddy is being rolled about.

* * * * *